US012159021B1

(12) United States Patent
Elancheralathan et al.

(10) Patent No.: US 12,159,021 B1
(45) Date of Patent: Dec. 3, 2024

(54) SEMANTIC DETECTION AND RENDERING IN DIGITAL CONTENT

(71) Applicant: Amazon Technologies, Inc., Reno, NV (US)

(72) Inventors: Vasanth Elancheralathan, Puducherry (IN); Medhini Gajapathy, Dindigul (IN); Aaishwarya Ramalingam, Chennai (IN); Hemant Kumar Agrawal, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 17/854,929

(22) Filed: Jun. 30, 2022

(51) Int. Cl.
*G06F 3/0483* (2013.01)
*G06F 40/205* (2020.01)
*G06F 40/30* (2020.01)
*G06V 30/414* (2022.01)

(52) U.S. Cl.
CPC .......... *G06F 3/0483* (2013.01); *G06F 40/205* (2020.01); *G06F 40/30* (2020.01); *G06V 30/414* (2022.01)

(58) Field of Classification Search
None
See application file for complete search history.

(56) References Cited

U.S. PATENT DOCUMENTS

| 7,657,507 | B2* | 2/2010 | Shi | G06F 16/951 |
| | | | | 707/999.002 |
| 8,275,600 | B2* | 9/2012 | Bilac | G06F 40/53 |
| | | | | 704/8 |
| 8,285,058 | B2* | 10/2012 | Sarkar | G06V 30/40 |
| | | | | 382/209 |
| 8,285,074 | B2* | 10/2012 | Saund | G06V 30/1914 |
| | | | | 382/209 |
| 8,370,282 | B1* | 2/2013 | Leung | G06V 10/7784 |
| | | | | 706/20 |
| 9,298,780 | B1* | 3/2016 | Madhani | G06F 16/212 |
| 9,396,540 | B1* | 7/2016 | Sampson | G06T 7/74 |
| 9,824,070 | B1* | 11/2017 | Sp | G06F 16/94 |
| 10,963,674 | B2* | 3/2021 | Tan | G06N 3/084 |
| 2005/0213805 | A1* | 9/2005 | Blake | G06V 10/993 |
| | | | | 382/137 |
| 2011/0007366 | A1* | 1/2011 | Sarkar | G06V 30/15 |
| | | | | 382/177 |

(Continued)

*Primary Examiner* — Matthew Ell
*Assistant Examiner* — Koorosh Nehchiri
(74) *Attorney, Agent, or Firm* — Hogan Lovells US LLP

(57) ABSTRACT

Systems and methods for determining semantic relationships in digital content are provided. Digital content may be processed to detect and extract one or more entities present in at least a subset of the digital content. The entities may include at least one image and at least one body of text. One or more aspects of the entities may be analyzed to filter out a subset of the entities based on a determined importance of the entities to the subset of the digital content. An anchor entity may be determined from one or more remaining entities after the filtering. Relationships between the one or more remaining entities and the anchor entity may be determined, and a presentation pattern for presenting the related entities may be determined. The presentation pattern may be stored to a repository and used as training data to detect future relationships within digital content.

20 Claims, 12 Drawing Sheets

(56) References Cited

U.S. PATENT DOCUMENTS

| | | | |
|---|---|---|---|
| 2011/0280490 A1* | 11/2011 | Sarkar | G06V 30/40 |
| | | | 382/209 |
| 2012/0128239 A1* | 5/2012 | Goswami | G06F 16/24578 |
| | | | 382/173 |
| 2017/0372190 A1* | 12/2017 | Bishop | G06F 16/00 |
| 2018/0040029 A1* | 2/2018 | Zeng | G06Q 30/0277 |
| 2019/0286942 A1* | 9/2019 | Abhiram | G06F 18/2148 |
| 2022/0075834 A1* | 3/2022 | Bar On | G06F 40/30 |
| 2022/0230020 A1* | 7/2022 | Saeugling | G06V 10/25 |
| 2022/0292258 A1* | 9/2022 | Zeng | G06V 30/413 |

\* cited by examiner

SEMANTIC DETECTION AND RENDERING IN DIGITAL CONTENT

BACKGROUND

Digital content is becoming increasingly popular, as content may be easily transportable and accessible from virtually anywhere. Such content may be provided for display on a device such as a laptop, smart phone, tablet, or e-reader. The content may include headings, text, and other various sections, including tables and images, which may be rendered on a screen based on the dimensions available for the device. Often, such sections may be rendered across different "pages," forcing users to swipe or "turn pages" back and forth to understand the content. For example, images or tables may be displayed separately from captions. Headings may be displayed separately from chapter starts. Tables and relevant text may be presented separately, which may be increasingly frustrating when a user is trying to understand complex information such as from a textbook or article. Question and answer sections may be separated, or unnecessary page breaks may cause the content's formatting to appear choppy or disjointed. Unhappy users dealing with these issues may end up submitting negative reviews, and users may be discouraged from using digital content over content that is provided in physical form.

BRIEF DESCRIPTION OF THE DRAWINGS

Various embodiments in accordance with the present disclosure will be described with reference to the drawings, in which.

DETAILED DESCRIPTION

Figure 1:
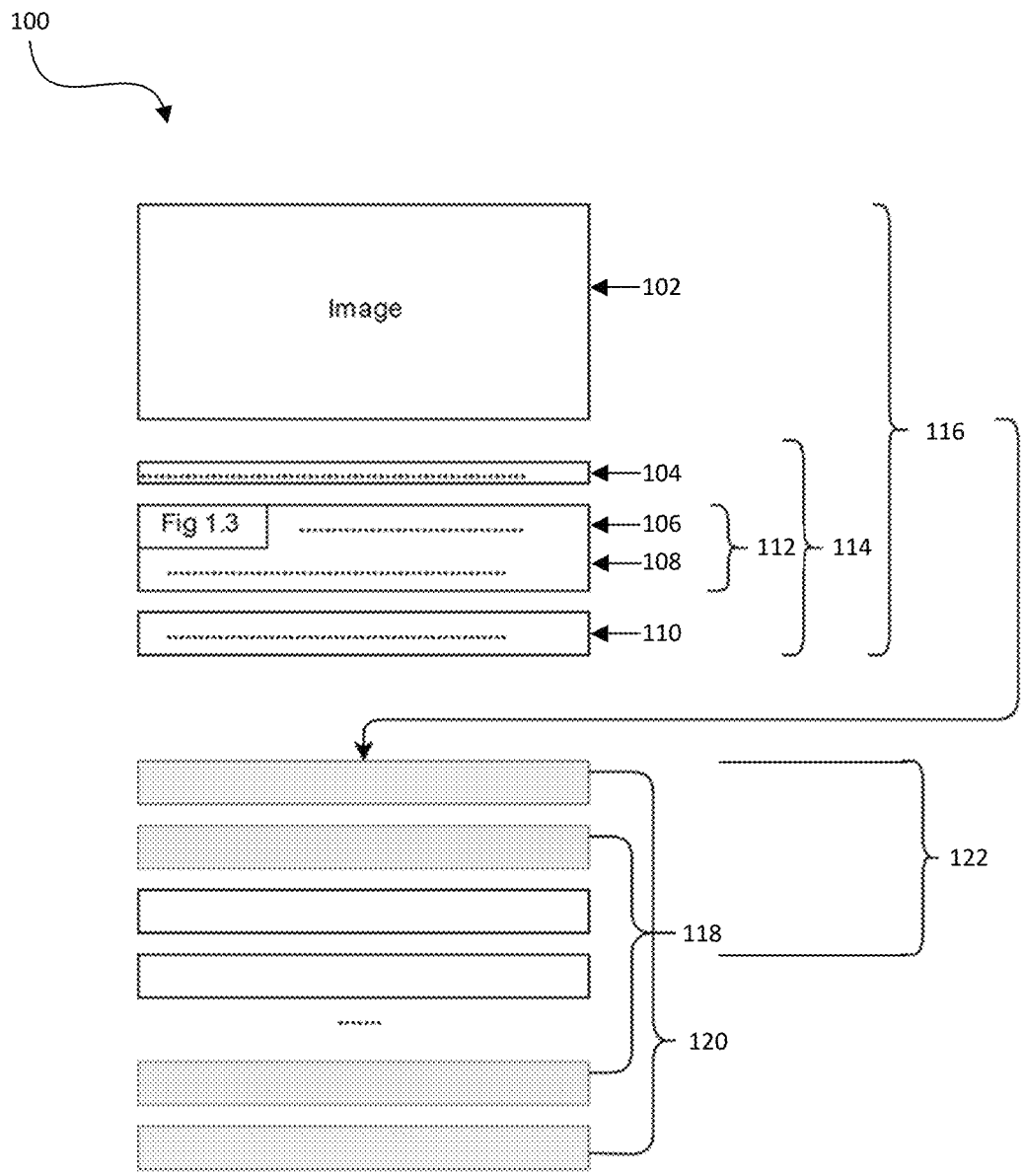
FIG. 1 illustrates example components and associated relationships, in accordance with an example embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches presented herein may address one or more of the aforementioned and other such problems. In accordance with an example embodiment, semantic information may be detected from digital content. This semantic information, which may also be referred to as figure-caption information in at least some embodiments, may include image information, text information, and graphical information, among other such information. Digital content may include an e-book, general digital literature, a comic book (including an image with text overlaid), content composed entirely of images or artwork, blogs, question-and-answer sections, tabular data without a table structure, and other reading platforms, among other such options. Using a combination of supervised and unsupervised machine learning and computer vision techniques, combinations of image, figure, and text relationships may be tagged with high accuracy, and the types and sub-types of image, figure, and caption parts may be identified. Detected semantic combinations may be used to deliver unique renderings and improve user experiences across digital content. Additionally, in accordance with one or more embodiments described herein, the semantic entities, when presented associated with each other, may provide for a higher level of combined semantic understanding than when they are presented separately.

According to an example, digital content may be analyzed to determine a structure of one or more parts and/or sub-parts of the content. A model may determine the extent to which the parts or sub-parts match predefined parameters, and the model may determine or define a relationship between the parts or sub-parts. For example, images or figures may be automatically tagged with captions or text information, or one or more images may be tagged together if they are determined to have a relationship. Based, at least in part, upon the tagged relationships, the image or figures may be rendered alongside caption or text information such that relevant relationships are displayed on the same page. In this way, a user is not required to flip through pages to understand the content and may instead only need to interpret the content presented on a single page. In an alternative embodiment, images may be tagged to each other, or text may be tagged with other text such that relevant image semantic groupings or text semantic groupings may be optimally presented on the same page.

Understanding similarities and differences within a pattern group may be utilized as a consistency check, to help measure consistency failure in digital content, to automatically fix differences to meet consistency metrics, to apply known properties of the pattern group to a new element, and to reduce excessive or missing breaks such as line-feeds within lines or paragraphs of digital content.

FIG. 1 illustrates example components and associated relationships, in accordance with an example embodiment. In this example, various components in a subset of digital content 100 that a user may see may include one or more entities, such as entities 102, 104, 106, 108, 110. The entities may correspond to an image, a figure, text, or other such information which may be present in digital content. A text entity may be detected based on the identification of keywords, logical lines, paragraphs, cells, and list items. In accordance with one or more embodiments described herein, the entities may be associated with each other. When given a page of digital content, such as a page which may be displayed on a table or e-reader, it may be beneficial to provide associated information on a single page. However, it may be difficult to determine how the information is associated with each other. In accordance with an example embodiment, an anchor entity may be identified to help determine how the anchor entity may be related to spatial neighbor entities. The anchor entity may provide a deterministic starting point for semantic grouping detection. In this example, an image such as image 102 may be selected or otherwise identified as an anchor entity. In other embodiments, some other entity such as text or a figure may be selected as an anchor entity. Anchor entities may be determined through a machine learning-based process. A machine learning algorithm may be trained using other data associated with the same piece of digital content, or from other pieces of digital content, such that the algorithm may be able to identify anchor entities within a given subset of digital content. Additionally, linked data associated with anchor entities may be used as training data across other pieces of digital content. For example, training data may be genre-specific for e-books. Alternatively, training data may come from a given piece of digital content itself, such as when specific formatting or patterns have been repeated throughout the digital content.

An anchor entity may be determined based on what the rarer entity is. For example, in this example shown in FIG. 1, there is only one image and several lines of text. Therefore, the image in this example is determined to be the anchor entity because the amount of images is less than the amount of text. In digital content, there is a possibility of a many-to-many relationship between images and captions. For example, two or more images may share a single caption, or a single image can have multiple text captions. Therefore, by selecting the rarer entity for the anchor entity, the complexity of relationships between images and text can be reduced. More than one anchor entity may be identified in some embodiments. For example, entity 106 may be identified as an anchor entity because it includes label "FIG. 1.3," indicating that the entity may include other entities explaining what FIG. 1.3 represents. In this example, text 108 may be associated with entity 106 to form a single semantic grouping of text 112. Once the association is determined, entity 106 no longer needs to serve as an anchor entity and image 102 can serve as the anchor entity instead.

Anchor entities may solve a non-deterministic problem associated with machine learning. Typically, machine learning algorithms utilize one or more fixed, known points that can be used as ground truth data. However, in determining how entities within digital content may fit with each other, there is no fixed point to begin with, so an anchor entity should be identified prior to determining relationships between entities. A keyword may be tagged as a particular entity, but in cases where there is a many-to-many relationship between images, text, or images and text, relationships may become too complex to determine. Further, any entity can be identified as an anchor, which makes determining relationships even more complex as unwanted images or text or other features such as spaces, promotional material, or decorative images may be inadvertently selected as an entity. Therefore, by determining an anchor entity in accordance with the present embodiments, the machine learning model may perform more accurately and reduce the overall complexity of the computations, thereby reducing the processing power and improving the processing speed and latency associated with semantic grouping determination and content rendering.

Once an anchor entity is determined, various relationships, or semantic groupings, may be determined for surrounding or neighboring entities. For example, for each identified image, text, or combination of images or text, a semantic grouping can be assigned. In one example embodiment, neighboring entities which are adjacent to the anchor entity based on reading order may be determined to be related to the anchor. Additionally, neighbors sharing a border with the anchor may be determined to be related to the anchor. Further, neighbors that are aligned with the anchor entity in a bounding box container may also be determined to be related to the anchor. Text may also be extracted and analyzed to determine relationships with features identified with respect to the anchor, including locational terms such as "above" and "below" and features present in the anchor. In this example, entity 106 describing "FIG. 1.3" may be identified as being a reference for an index, like a textbook index. Entities 106 and 108, when combined with entities 104 and 110, may indicate that there are a series of paragraphs, one of which is being indexed and has textual content. In this case, because entities 104, 106, 108, and 110 are related, they may be grouped into a semantic grouping, 114.

It may be determined that an image, such as image 102, is related to an entity, such as entity 106, or a semantic grouping, such as semantic grouping 114. In this case, image 102 may be combined with semantic grouping 114 to generate a new semantic grouping 116, the semantic grouping corresponding to a relationship or association between the image and text.

Once a semantic grouping has been determined, one or more patterns that may be present within digital content may be determined. For example, a pattern may repeat throughout the piece of digital content, so when a semantic grouping for a subset of the digital content has been determined, the semantic grouping or pattern may be used as training data to identify other semantic groupings that follow the same pattern. The training data may be applied to the same piece of digital content, or across other pieces of digital content. This pattern does not have to be anchor-specific, so different images or text can follow the same pattern. In the example shown in FIG. 1, a pattern, such as pattern 118 and 120 may be generated based on the generated semantic groupings. The identified entities may be assigned or otherwise associated with the patterns. The patterns may be stored to a repository for future use, such as for training data for future digital content analysis.

According to an example, a pattern may include a figure or image on top of a caption or body of text. In another example pattern, a figure or image may be on the bottom of a caption or body of text. In yet another example pattern, a figure or image may be provided alongside with a caption or body of text. These examples are not meant to be limiting and may include other patterns such as those comprised only of images or only of text, or different layouts. Information such as similarities and differences between patterns may be determined, and labels may be assigned to the patterns, either manually or automatically. In some example embodiments, a sequence of patterns 122 may be generated based on the patterns. The sequences may also be utilized as training data to identify other sequences within the digital content, or across other pieces of digital content.

One or more of the processes described herein may be performed before a user even opens the piece of digital content. In an example, one or more desktop clients may be accessed by a user. The digital content may be imported to the desktop client from a repository, such as a repository provided by a service provider. The digital content, in its modified or unmodified form, may be imported to the desktop client and run in real-time such that there is little to no perceptible lag in conversion and presentation of the content.

Figure 2B:
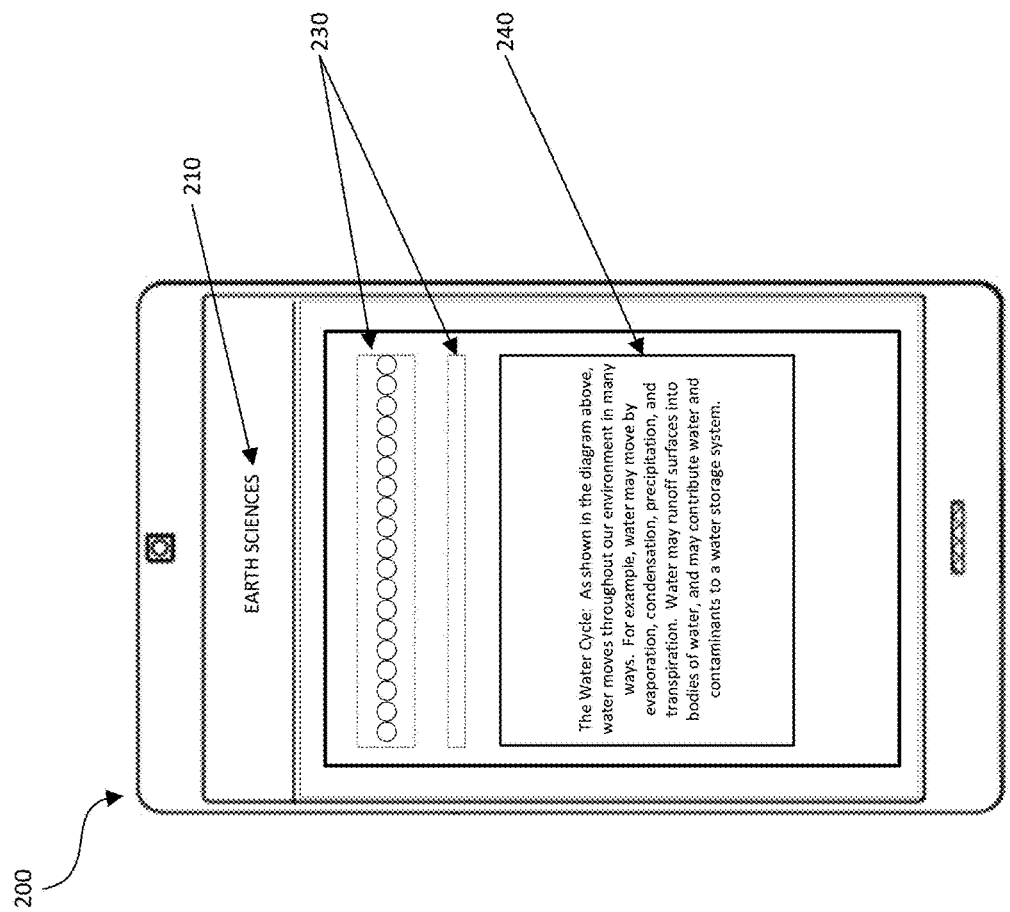
FIGS. 2A-2C illustrate an example process for generating a semantic grouping in digital content, according to an example embodiment.
Figure 2A:
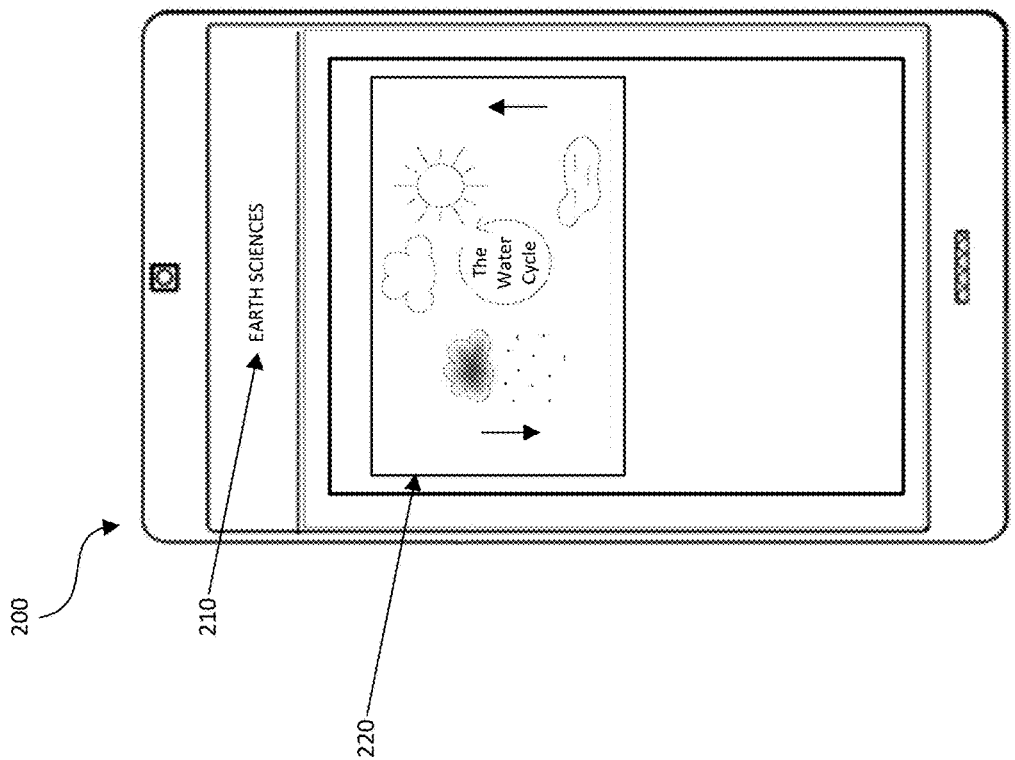
Figure 2C:
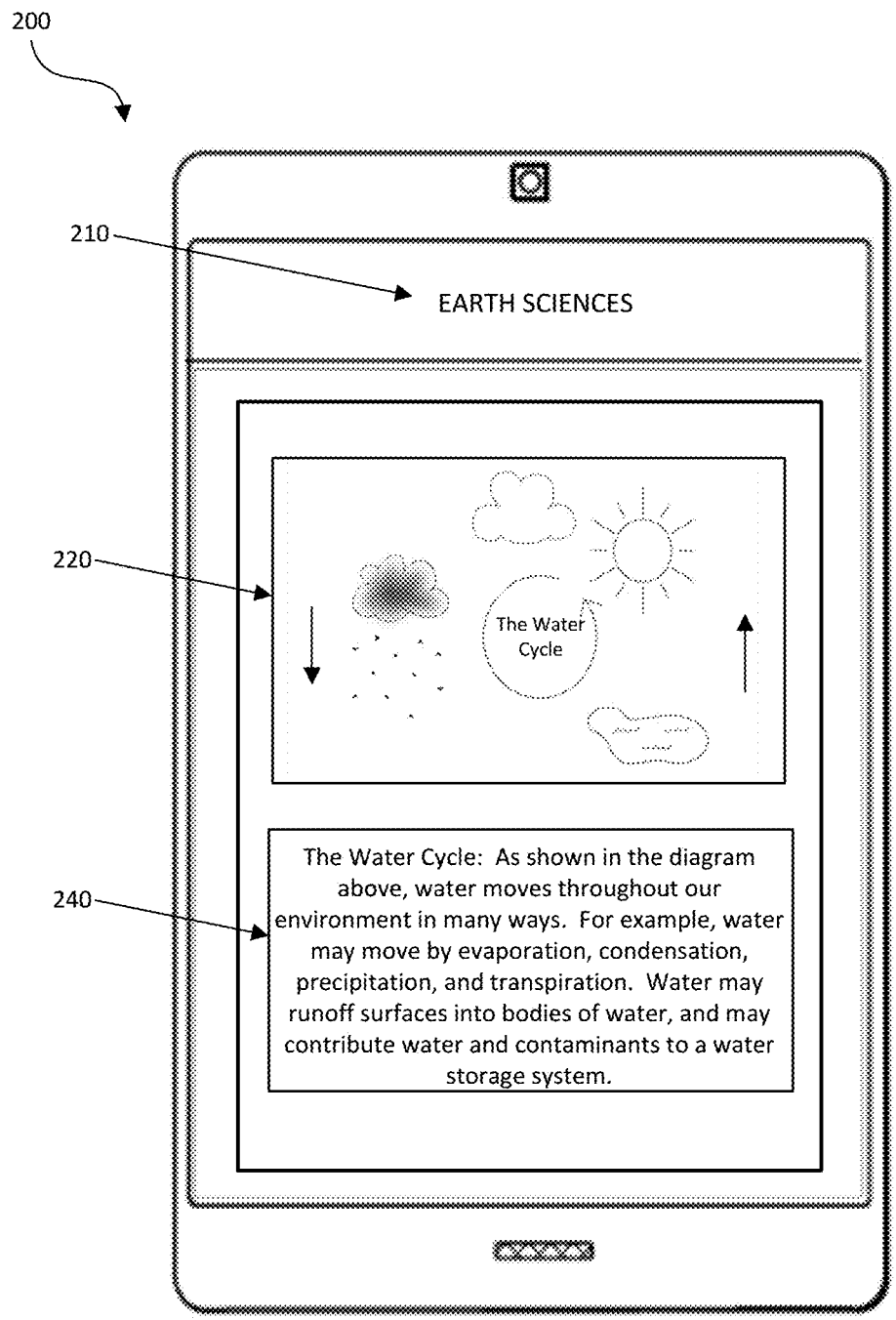

FIGS. 2A-2C illustrate an example process for generating a semantic grouping in digital content, according to an example embodiment. In this example, a tablet, smartphone, electronic reader ("e-reader"), or other such device including a display such as display 200 may be provided. The device may display a piece of digital content, such as "pages" of an Earth Sciences electronic book ("e-book"). The title of the content 210 may be presented on the display 200, but in some embodiments the title may be provided at other locations or not be displayed at all on a given page. Sometimes, an e-book may present an image, such as image 220 shown in FIG. 2A, and caption information, such as caption 240 of FIG. 2B, on separate pages. Such a presentation pattern may frustrate a user because they might be required to flip back and forth between pages to fully understand the caption as it applies to the figure.

According to one or more embodiments described herein, a spatial semantics entity detection process may be applied to the digital content. In this process, one or more parts, or entities, in the content may be identified, and a spatial relationship of the entities may be determined. In an example embodiment, spatial relationships may be determined based on a count and matching dimension of figures adjacent to a target or anchor figure, a combined boundary being below a threshold percentage of known combined boundaries, a width or high matching an adjacent boundary either horizontally or vertically, a corner match of boundaries, region packing, relative spacing between entities, and unique boundaries, dimensions, and placements within a page view. In the examples shown in FIGS. 2A and 2B, entities may include image 220, caption 240, and decorative item and spacing 230. In some embodiments, machine learning may be utilized to perform a spatial semantics entity detection process. Another machine learning algorithm may be utilized to analyze any images within the entities and determine whether they are important or relevant to the main understanding of the content of the content. The images may include relevant images that are pertinent to the content, and features that are not pertinent or important to the content such as decorative images, promotional images, background images, layout images, or unimportant headers. The images may be analyzed and scored, such that images that fall below a threshold level are determined to be unimportant or unwanted. The unwanted images may be filtered out, such as the decorative images, promotional images, background images, layout images, or unimportant headers. In this example shown in FIGS. 2A and 2B, the decorative item and spacing 230 may be filtered out such that they will not be considered in later processes or displayed to an end-user. As shown in FIG. 2C, the decorative item and spacing 230 have been removed. In some embodiments, the filtering of unwanted or irrelevant images may occur prior to the spatial semantics entity detection process, to avoid selection of an unwanted image as an anchor entity. In other embodiments, this filtering step may not be necessary, and the one or more embodiments described herein may not require image importance detection and filtering.

In determining whether an image is important or relevant, the image content may be analyzed, such as by using a machine learning algorithm. The image content within the digital content may be iteratively analyzed to determine whether the images are relevant to the main understanding of the content. One or more image processing methods may be utilized to analyze the image content. Content and context information surrounding the image may also be analyzed and used to determine whether the image is important. For example, the reuse of an image throughout the piece of digital content may be analyzed. In this example, the more frequently an image may appear throughout the content, the more likely it is important. Additionally, one or more links between the anchor entity and an identifier or keyword may be analyzed. Links to alternative text or target text keywords may also be analyzed. Text may also be analyzed, in another embodiment, to determine whether there are any references to the image based on keywords, such as "image below," for example. Text presence within an image may be processed to analyze the positioning of the text within the image (e.g., bottom, top, left-right span, among other such options), an image density score indicating whether an image is densely packed, whether the image is decorative, how many images there are, and how natural the image appears to be, among other such information. In another example overall book regions and entity type regions that are within a central 90% of the spread can be identified to ensure outlier and anomalous content removal. For images, a check can be performed for the original and rendered dimension for cleanup. Images can be associated with adjacent images to identify an image set, sharing a common presentation pattern and/or textual properties.

Further, one or more properties may be normalized, such as text color, entity references, and book content locations, among other such options. Text prefixes may be detected and matched, both with and without a dictionary. Additionally, in an example, a check may be performed to determine whether a current entity text matches any known keywords or a text wildcard. In some embodiments, a type of text may be identified and analyzed, such as whether it is in a single- or multi-line paragraph, whether the content is distinguishable from secondary content, whether the text is continuous in a given region, whether the text is present on both sides of an anchor image, whether the text is linked internally using references such as HTML references, whether the text is shared across two or more anchor images, whether there is subtext referring to two or more anchor images, and whether the language is unsupported, among other such options.

In accordance with an example embodiment, an image may be analyzed based on how it is presented on a "page" of digital content. For example, an image may be provided across a fraction of the page, or an image may be presented in the center of the page shown as a big block with decorations to the left and right. In the latter example, a higher importance score may be provided for the image because the author has likely wanted to give more importance to that image.

After analyzing various features of the images, the features may be scored from 0-100. The machine learning algorithm may then analyze the scores and determine which combinations of features and scores make an image more important or less important. For example, if an image is at the start or the end of a digital book, the image will likely be assigned a lower score and will therefore not be as important. If the image is large and is being repeated in multiple "pages", then a higher score may be assigned indicating a higher importance. The machine learning algorithm may look at hundreds of features and combinations of features to determine whether an image is important. In one embodiment, any unimportant or unwanted images may be filtered out. In this way, only relevant images may be processed thereby improving the accuracy of the system, speeding up processing time for the system, and reducing latency associated with rendering.

In accordance with an example embodiment, spatial entity semantics detection may occur as a parallel process to determining an importance of an image. In this way, both processes may help each other to determine the best anchor image and develop a better understanding of relationships within digital content.

After an anchor image has been determined, an image category detection process may analyze an image and attempt to categorize it, according to an example embodiment. For example, such a process may attempt to determine whether an image is natural or non-natural, or determine where on a spectrum from natural to non-natural the image lies. In one example embodiment, an image may be scored from 0-100. A score of 100 may indicate that there is 100% evidence that most or all of the content in the image is artificially generated (e.g., a chart, flowchart, graph, or a computer-generated diagram). A score of 0 may indicate that there is no evidence that any artificial features are present or embedded within the image (e.g., a photograph or scenic image without artificial content). Images such as paintings, hand-drawn images, or diagrams that have natural scenery as a background may fall within this spectrum. The system may attempt to determine what type of content is being provided in digital content based on an image category detection process. A category, in accordance with an example embodiment, may identify whether an image includes a natural scene or artificially-generated scene. Additionally, a type of the category or a sub-category may be determined, such as whether the image is a photograph, a painting, a computer-generated image, among other such options. These examples are not intended to be limiting and may include other types of natural or non-natural images. In accordance with another example embodiment, a category may indicate what the digital content is, such as a document or a book. Within the category, one or more types or sub-categories may be determined such as a poster, newspaper, or brochures for a document or a scientific book, a cook book, or a reference guide for a book. A category detection process may help in identifying non-overlapping groups of images. Further, identifying a type of category or identifying a sub-category may help the system have more control over how an image is to be handled. For example, if a caption describes a painting, an image categorized as a painting may be associated with the caption with higher confidence than if the system did not have an understanding of the category and sub-category or type represented in the image. Figure-caption pairings may still be determined even if an image category detection process is not performed.

A classification system, in accordance with an example embodiment, may be utilized to determine whether an image is important, and how entities are associated with each other. The classification system may be a neural network-based or other machine learning-based system. In an example embodiment, if there are a set of images that appear to come from the same category, then the system can group those images together to form a pattern. The system can use the scoring to prevent grouping images into a pattern which may not be relevant. For example, images falling within a determined threshold of a first image may be associated with the first image. Additionally, a category detection process may determine what text information might be associated with an image. For example, if an image is more natural, then the caption may describe natural features within the image. If the image is related to a chart, then the caption information may relate to the chart. In the example shown in FIGS. 2A and 2B, the image 220 may show a combination of natural and unnatural features describing a water cycle. A description related to the water cycle, such as caption 240, may be determined to be related to the image because the caption 240 describes the natural and unnatural features within the image 220. As such, the image 220 and caption 240 may jointly form a semantic grouping, and may be presented for display together, such as by using a presentation pattern like the presentation pattern shown in FIG. 2C.

Images and text may also be analyzed to determine whether an image is of high or low quality, in accordance with an example embodiment. For example, one or more factors may be analyzed such as whether there are distortions in the image, what kinds of distortions there are, what the magnitude of the distortions is, whether the text is readable, whether there is bad contrast quality, and whether the font is large enough to read by the naked eye, among other such factors. A score may be assigned, from 0-100, to assess image quality. For example, a score closer to 0 may indicate that the image or text is of low quality. If the score falls below a determined threshold, level of quality, such information may be provided to a publisher or author of the digital content so that the publisher or author may make corrections.

In accordance with an example embodiment, after the important images have been determined and analyzed, after relationships with surrounding content have been determined, and the images have been categorized, this information may be utilized to determine presentation patterns or additional semantic groupings such that when a figure and caption get rendered, they get presented in such a way that is meaningful to an end-user. For example, the information determined from one or more steps described herein may be utilized to determine how to present information on a "page" of digital content so that the user can have an improved experience without having to flip pages for grouped content. Such a process may be performed using machine learning. Without this consideration, if a user is presented with an image, relevant text explaining the contents of the image may be presented on a following page, so a user has to flip back and forth between pages to fully understand the content.

In one example embodiment, if a user double taps, clicks on, or otherwise selects an image presented to them in order to enlarge the image, related caption or other text information may be displayed along with the enlarged image. Such a presentation pattern may help to provide better context to the user.

Figure 3B:
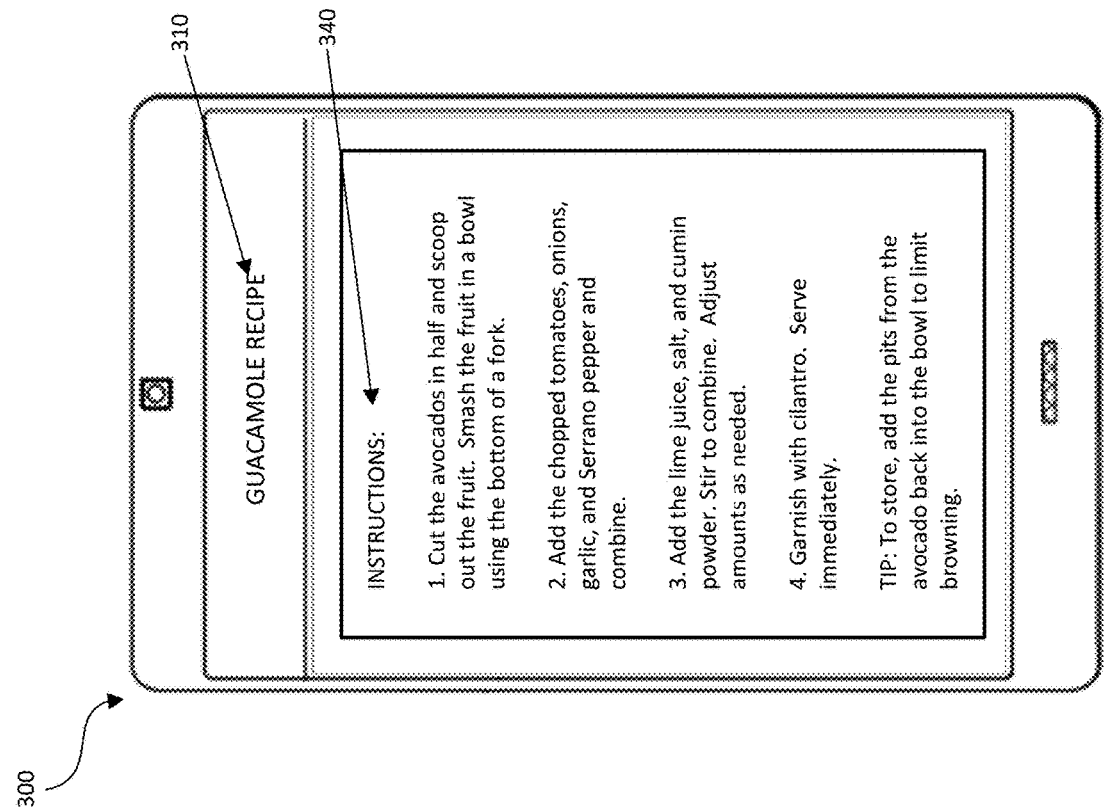
FIGS. 3A-3C illustrate another example process for generating a semantic grouping in digital content, according to an example embodiment.
Figure 3A:
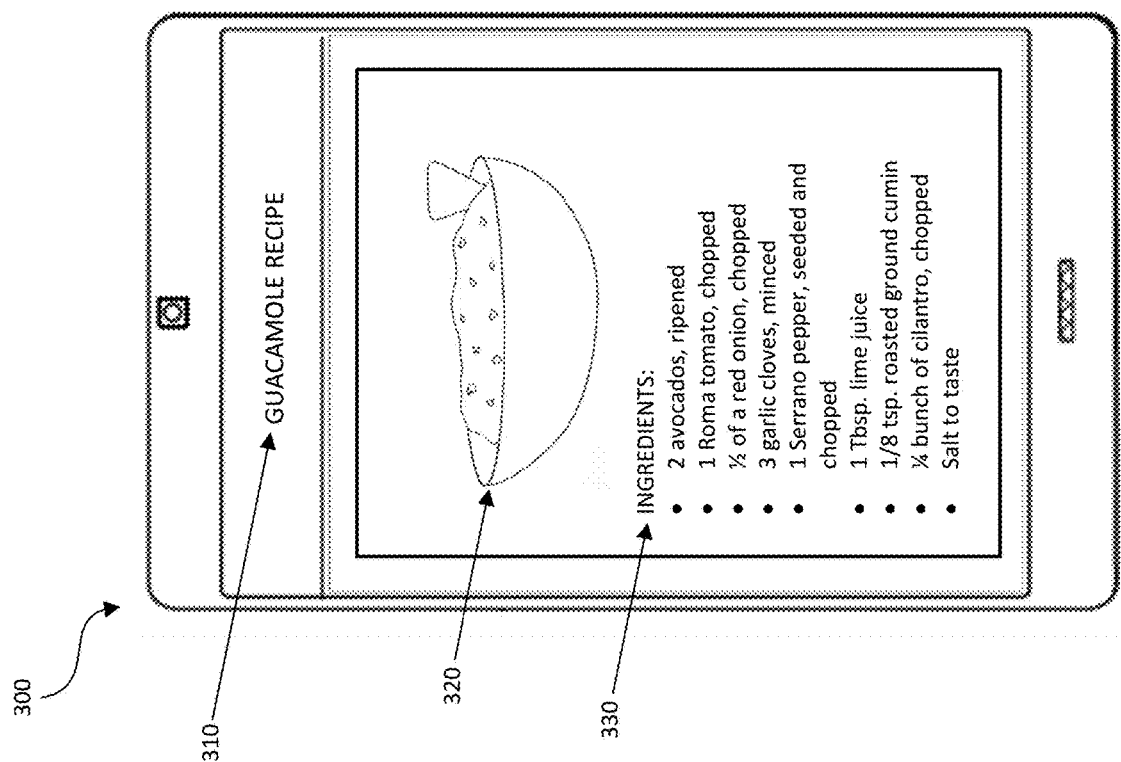
Figure 3C:
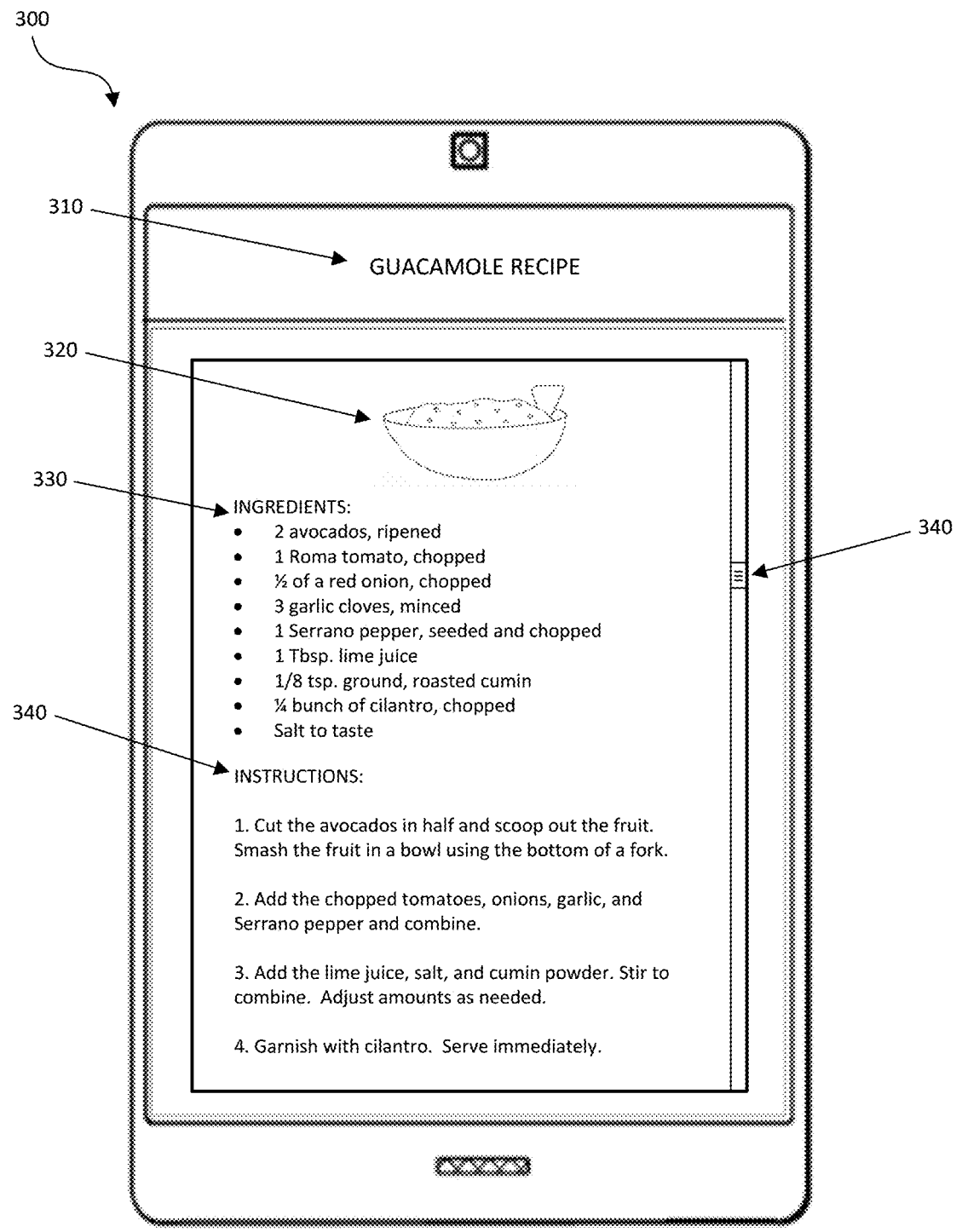
Figure 4A:
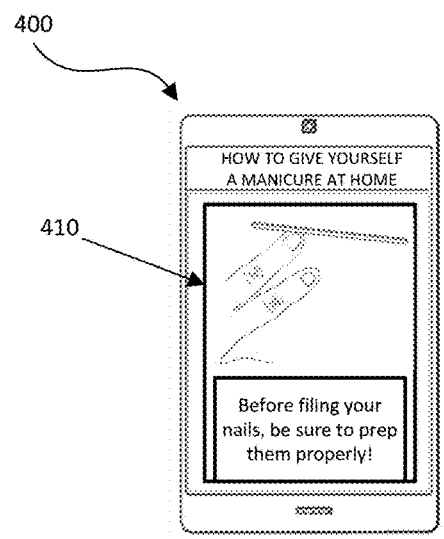
FIGS. 4A-4G illustrate another example process for generating a semantic grouping in digital content, according to an example embodiment.
Figure 4B:
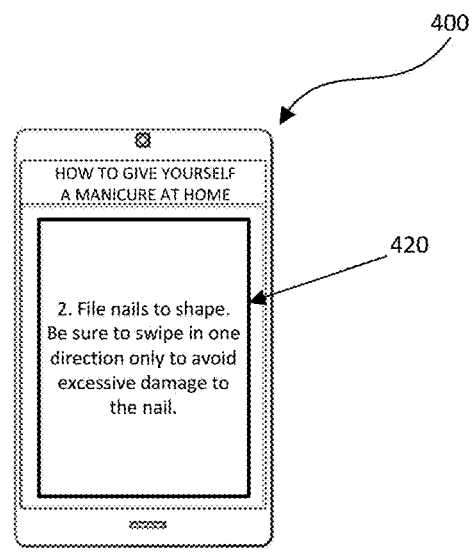
Figure 4C:
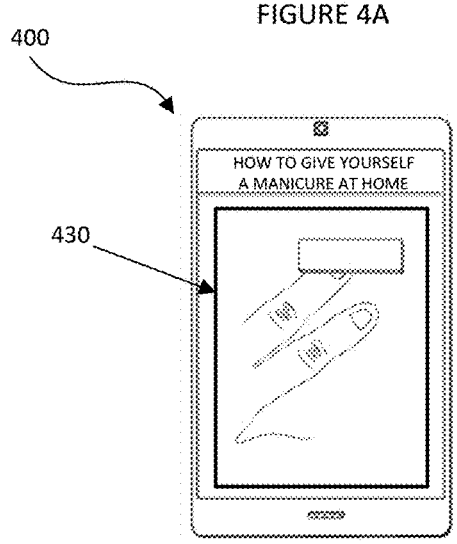
Figure 4D:
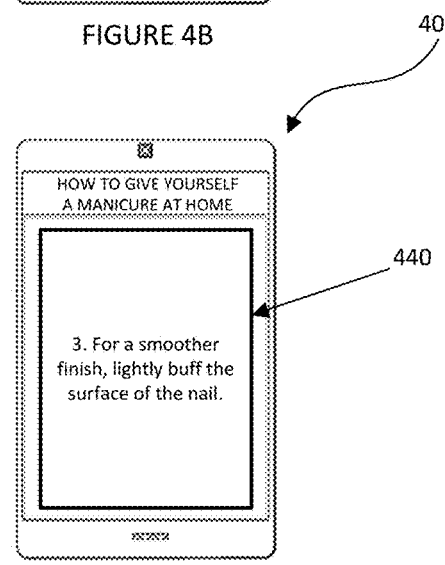
Figure 4E:
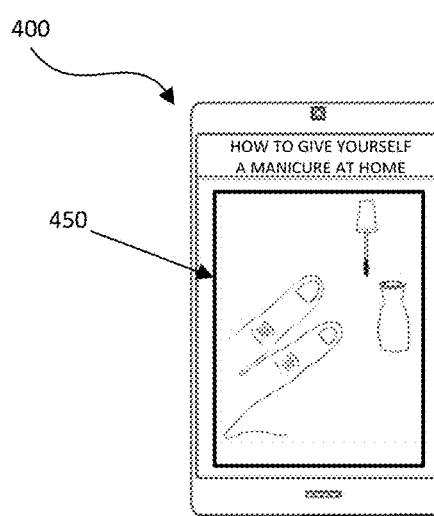
Figure 4F:
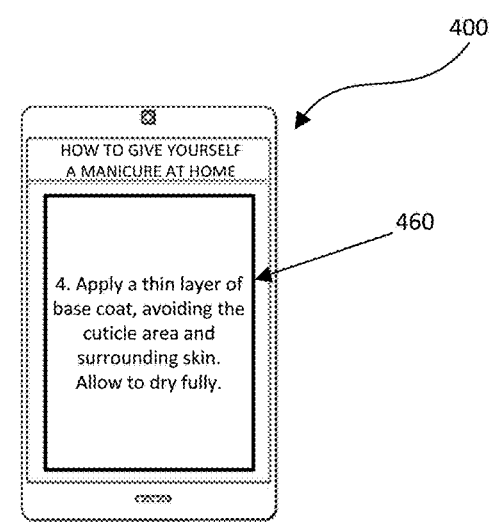
Figure 4G:
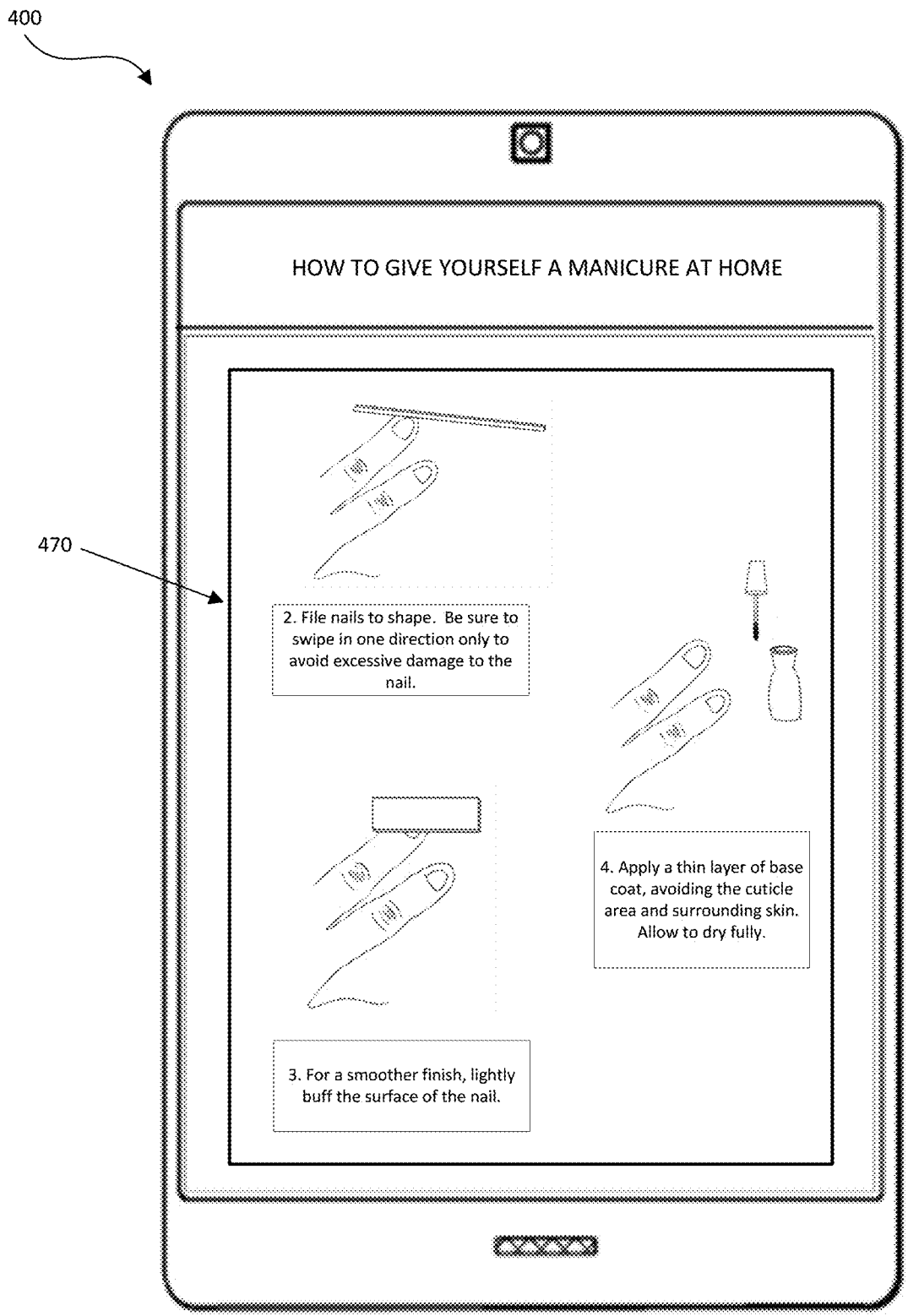

FIGS. 3A-3C illustrate another example process for generating a semantic grouping in digital content, according to an example embodiment. In this example, a display such as a tablet, smartphone, or e-reader 300 may provide digital content, such as a guacamole recipe 310 within a larger cookbook, for display. Digital content as shown in FIGS. 3A and 3B may include an image 320 of ingredients or what the final dish may look like, a list of ingredients 330, and instructions for making the recipe 340. If a reader were to be provided a recipe in a presentation pattern such as the pattern shown in FIGS. 3A and 3B, the reader would be required to "flip" back and forth between "pages" to understand how the ingredients are to be prepared and added, and to understand how the end dish is supposed to look. Such a presentation pattern may make it more difficult for a user to navigate through as various recipes may include several pages of content within a single cookbook. Additionally, while a user is cooking, it may be difficult to flip between pages to see all of the content.

One or more embodiments described herein may enable digital content to be presented on a single page such that a user would not be required to flip between pages to understand the content. As shown in FIG. 3C, the digital content may all be provided for display on a single "page", and the user may be provided with an option to scroll using a scroll bar such as scroll bar 340. In this way, the user may be able to see an image of the final product 320, the ingredients 330, and the instructions 340 all on the same page.

In an example embodiment, a machine learning algorithm may be utilized to analyze the digital content to determine various spatial entities within the digital content. For example, as shown in FIG. 3C, entities may include an image 320, an ingredients list 330, and instructions 340. A machine learning algorithm may also be utilized to analyze the image and text and determine an anchor entity. In this example, the anchor entity may be the final product image 320, as may be determined using one or more image importance detection processes described elsewhere herein. The final product image may be analyzed, such as through an image category detection process and other image processing methods, to determine one or more ingredients, such as avocados, tomatoes, onions, etc. In this example, the system may determine that the image is a natural image or photograph and may utilize this information to determine any associated text that might relate to the anchor image. For example, ingredients or instructions may reference one or more items shown in the anchor image. In another example embodiment, an ingredients list may be utilized as a sub-anchor entity to first pair the ingredients list to the instructions, and then pair the sub-anchor entity to the image. In yet another example embodiment, the ingredients list or instructions may be utilized as an anchor entity, and the image and remaining text may be paired with the ingredients list or instructions. In this way, individual pieces or entities of a single recipe may be associated with each other and provided for display to the user. If the recipe book follows a repeating pattern of image, ingredients, and instructions, the pattern may be utilized as training data in the machine learning algorithm for future associations with other recipes.

FIGS. 4A-4G illustrate another example process for generating a semantic grouping in digital content, according to an example embodiment. In this example, a single topic, such as how to give a manicure at home, may span several pages of digital content that may be provided for display on a tablet, smartphone, or e-reader 400. As shown in FIGS. 4A-4F, images 410, 430, and 450 may be associated with text 420, 440, and 460. Additionally, images 410, 430, and 450 and their associated text portions may be associated with each other, as may be the case when a genre or topic is shared across the images for example. Using a spatial entity semantics detection process, such as one or more processes described elsewhere herein, various entities within the digital content may be identified, such as images 410, 430, 450 and text portions 420, 440, and 460. Among these images and text portions, anchor entities may be determined. For example, an image importance detection process may be utilized to determine an importance of the various images. In another example embodiment, image importance detection may not be performed. In this example, images 410, 430, and 450 may serve as anchor entities. An image category detection process may be utilized to determine features present within the images, such as a nail file in image 410, a buffer in image 430, and a type of nail polish in image 450. In accordance with an example embodiment, the system may determine that the images are natural and are not artificially generated, or the system may determine that the images are natural with artificially-generated text overlaying the image. The system may also determine a sub-category or type of the images, such as a photograph. Using this information, the system may determine that text referencing filing nails, such as text portion 420, may be related to image 410 with the nail file. The system may also determine that text referencing buffing nails, such as text portion 440, may be related to image 430 with the buffer. Further, the system may determine that a text portion referencing a base coat, such as text portion 460, may be related to image 450 with the nail polish. In this way, the system may establish semantic groupings between image 410 and text portion 420, between image 430 and text portion 440, and between image 450 and text portion 460. Additionally, as shown in image 410, text information may be overlaid on top of the image in some example embodiments. This text information may be analyzed, in accordance with an example embodiment, to determine contextual information for the semantic grouping process. For example, Optical Character Recognition (OCR) processes may be utilized to recognize the text overlaid in the image. The recognized text may be analyzed, such as through a machine learning process, to develop an understanding of the text. Based on the understanding, the system may be able to determine associations between text and images.

In accordance with another example embodiment, the system may analyze given text portions and determine how the text should be presented to the user. For example, the overlaid text in image 410 describes a process that should happen prior to the actual step shown in image 410 of FIG. 4A. The system may analyze the text to determine that the overlaid text may not be pertinent to the immediate image and should instead be displayed on a page prior to where image 410 is displayed.

The system may also determine that these semantic groupings may all be associated with each other, based on various features analyzed by the system. For example, all images have similar features, such as a hand in on the left side of the image showing two fingers. Additionally, the system may determine that all three text portions reference features associated with nails. Based on these features, the system may determine to reformat presentation of the information, such as the format 470 shown in FIG. 4G. In this way, all three steps of filing the nails, buffing the nails, and applying a base coat may be presented on a single page instead of multiple pages of digital content. Such a format may improve user experience as the user is not required to flip across multiple pages to understand the various steps being provided for display.

Figure 5:
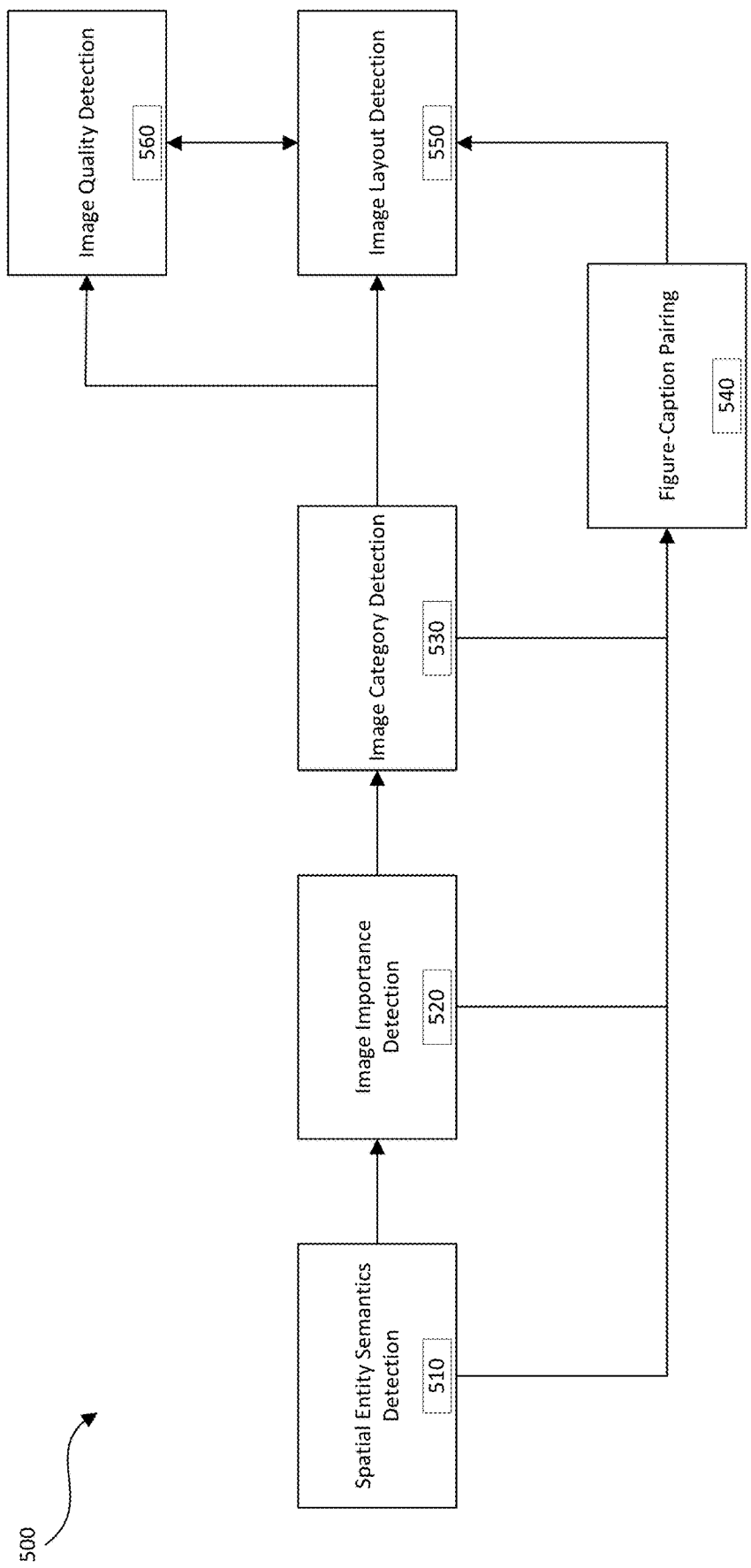
FIG. 5 illustrates an example system for implementing one or more aspects in accordance with various embodiments.

FIG. 5 illustrates an example system for implementing one or more aspects in accordance with various embodiments. According to one or more embodiments described herein, a system 500 may cause a spatial semantics entity detection process 510 to be performed on digital content. In this process, one or more parts, or entities, in the content may be identified, and a spatial relationship of the entities may be determined. For example, entities may include images, captions, text, figures, decorative items, promotional items, and spacings, among other such entities. In some embodiments, machine learning may be utilized to perform this spatial semantics entity detection process.

The system may analyze positional information, such as where an image may be positioned within the digital content, and where an image may be positioned within a sub-section of the digital content. Additionally, the system may determine an importance of a contextual region, such as the presence of promotional text. Further, the system may analyze the presence of long running paragraphs, tabular data, and rich text styles relative to other regions. In an example embodiment, the system may analyze a relative closeness of non-sibling containers relative to an overall piece of digital content such that non-related items may be grouped separately from each other. Hierarchical information may be determined for a subset of digital content. In this example, the system may determine whether an image shares a level with other important images, whether a child or sibling relationship is known, and how the text or image is positioned upon a page.

The system 500 may also perform an image importance detection process 520 on the images. In this example, a machine learning algorithm may be utilized to analyze any images within the entities and determine whether they are important or relevant to the main understanding of the content of the content. The images may include relevant images that are pertinent to the content, decorative images, promotional images, background images, layout images, or unimportant headers. The unimportant, irrelevant, or unwanted images may be filtered out, such as the decorative images, promotional images, background images, layout images, or unimportant headers. By filtering out these images, the unimportant, irrelevant, or unwanted images will not be considered in later processes or displayed to an end-user. This filtering process may speed up processing and improve latency, as fewer entities have to be processed by the computer. In some embodiments, the filtering of unwanted images may occur prior to the spatial semantics entity detection process, to avoid selection of an unwanted image as an anchor entity. In other embodiments, this filtering step may not be necessary, and the one or more embodiments described herein may not require image importance detection and filtering.

In determining whether an image is important, the image content may be analyzed, such as by using a machine learning algorithm. The image content within the digital content may be iteratively analyzed to determine whether the images are relevant to the main understanding of the content. One or more image processing methods may be utilized to analyze the image content. Content and context information surrounding the image may also be analyzed and used to determine whether the image is important. Importance scores may be determined for the images and text information, and entities with associated scores falling below a determined threshold may be filtered out. In an example embodiment, the reuse of an image throughout the piece of digital content may be analyzed. In this example, the more frequently an image may appear throughout the content, the more likely it is important. Additionally, one or more links between the anchor entity and an identifier or keyword may be analyzed. Links to alternative text or target text keywords may also be analyzed. Text may also be analyzed, in another embodiment, to determine whether there are any references to the image based on keywords, such as "image below," for example. Text presence within an image may be processed to analyze the positioning of the text within the image (e.g., bottom, top, left-right span, among other such options), an image density score indicating whether an image is densely packed, whether the image is decorative, how many images there are, and how natural the image appears to be, among other such information. In another example overall book regions and entity type regions that are within a central 90% of the spread can be identified to ensure outlier and anomalous content removal. For images, a check can be performed for the original and rendered dimension for cleanup. Images can be associated with adjacent images to identify an image set, sharing a common presentation pattern and/or textual properties.

Further, one or more properties may be normalized, such as text color, entity references, and book content locations, among other such options. Text prefixes may be detected and matched, both with and without a dictionary. Additionally, in an example, a check may be performed to determine whether a current entity text matches any known keywords or a text wildcard. In some embodiments, a type of text may be identified and analyzed, such as whether it is in a single- or multi-line paragraph, whether the content is distinguishable from secondary content, whether the text is continuous in a given region, whether the text is present on both sides of an anchor image, whether the text is linked internally using references such as HTML references, whether the text is shared across two or more anchor images, whether there is subtext referring to two or more anchor images, and whether the language is unsupported, among other such options.

In accordance with an example embodiment, an image may be analyzed based on how it is presented on a "page" of digital content. For example, an image may be provided across a fraction of the page, or an image may be presented in the center of the page shown as a big block with decorations to the left and right. In the latter example, a higher importance score may be provided for the image because the author has likely wanted to give more importance to that image.

After analyzing various features of the images, the features may be scored from 0-100. The machine learning algorithm may then analyze the scores and determine which combinations of features and scores make an image more important or less important. For example, if an image is at the start or the end of a digital book, the image will likely be assigned a lower score and will therefore not be as important. If the image is large and is being repeated in multiple "pages", then a higher score may be assigned indicating a higher importance. The machine learning algorithm may look at hundreds of features and combinations of features to determine whether an image is important. In one embodiment, any unimportant or unwanted images may be filtered out. In this way, only relevant images may be processed thereby improving the accuracy of the system, speeding up processing time for the system, and reducing latency for rendering.

After an anchor image has been determined, the system 500 may perform an image category detection process 530 to analyze an image and attempt to categorize it, in accordance with an example embodiment. A category, in accordance with an example embodiment, may identify whether an image includes a natural scene or artificially-generated scene. Additionally, a type of the category or a sub-category may be determined, such as whether the image is a photograph, a painting, a computer-generated image, among other such options. For example, an image category detection process may attempt to determine whether an image is natural or non-natural, or determine where on a spectrum from natural to non-natural the image lies. In one example embodiment, an image may be scored from 0-100. A score of 100 may indicate that there is 100% evidence that most or all of the content in the image is artificially generated (e.g., a chart, flowchart, graph, or a computer-generated diagram). A score of 0 may indicate that there is no evidence that any artificial features are present or embedded within the image (e.g., a photograph or scenic image without artificial content). Images such as paintings, hand-drawn images, or diagrams that have natural scenery as a background may fall within this spectrum. These examples are not intended to be limiting and may include other types of natural or non-natural images. In accordance with another example embodiment, a category may indicate what the digital content is, such as a document or a book. Within the category, one or more types or sub-categories may be determined such as a poster, newspaper, or brochures for a document or a scientific book, a cook book, or a reference guide for a book. A category detection process may help in identifying non-overlapping groups of images. Further, identifying a type of category or identifying a sub-category may help the system have more control over how an image is to be handled. For example, if a caption describes a painting, an image categorized as a painting may be associated with the caption with higher confidence than if the system did not have an understanding of the category and sub-category or type of category represented in the image. Figure-caption pairings may still be determined even if an image category detection process is not performed.

A classification system, in accordance with an example embodiment, may be utilized to determine whether an image is important, and how entities are associated with each other. The classification system may be a neural network-based or machine learning-based system. In an example embodiment, if there are a set of images that appear to come from the same category, then the system 500 can group those images together to form a pattern. The system can use the scoring to prevent grouping images into a pattern which may not be relevant. Additionally, a category detection process may determine what text information might be associated with an image. For example, if an image is more natural, then the caption may describe natural features within the image. If the image is related to a chart, then the caption information may relate to the chart. The system 500 may then perform a figure-caption pairing process 540 to pair figures or images with their associated captions. In other embodiments, images may be paired to each other and captions may be paired to each other.

The system 500 may also analyze images and text to determine whether an image is of high or low quality though an image quality detection process 560, in accordance with an example embodiment. For example, one or more factors may be analyzed such as whether there are distortions in the image, what kinds of distortions there are, what the magnitude of the distortions is, whether the text is readable, whether there is bad contrast quality, and whether the font is large enough to read by the naked eye, among other such factors. A score may be assigned, from 0-100, to assess image quality. For example, a score closer to 0 may indicate that the image or text is of low quality. Such information may be provided to a publisher or author of the digital content so that the publisher or author may make corrections.

In accordance with an example embodiment, after the important images have been determined and analyzed, after relationships with surrounding content have been determined, and the after images have been categorized, all of this information may be utilized to determine presentation patterns or additional semantic groupings such that when a figure and caption get rendered, they get presented in such a way that is meaningful to an end-user. For example, the system 500 may utilize the information determined from one or more steps described herein, in an image layout detection process 550, to determine how to present information on a "page" of digital content so that the user can have an improved experience without having to flip pages for grouped content. Such a process may be performed using machine learning. Without this consideration, if a user is presented with an image, relevant text explaining the contents of the image may be presented on a following page, so a user has to flip back and forth between pages to fully understand the content.

In one example embodiment, if a user double taps, clicks on, or otherwise selects an image presented to them in order to enlarge the image, related caption or other text information may be displayed along with the enlarged image. Such a presentation pattern may help to provide better context to the user. It should be understood that for any process herein there can be additional, fewer, or alternative steps performed in similar or alternative orders, or in parallel, within the scope of the various embodiments unless otherwise specifically stated.

Figure 6:
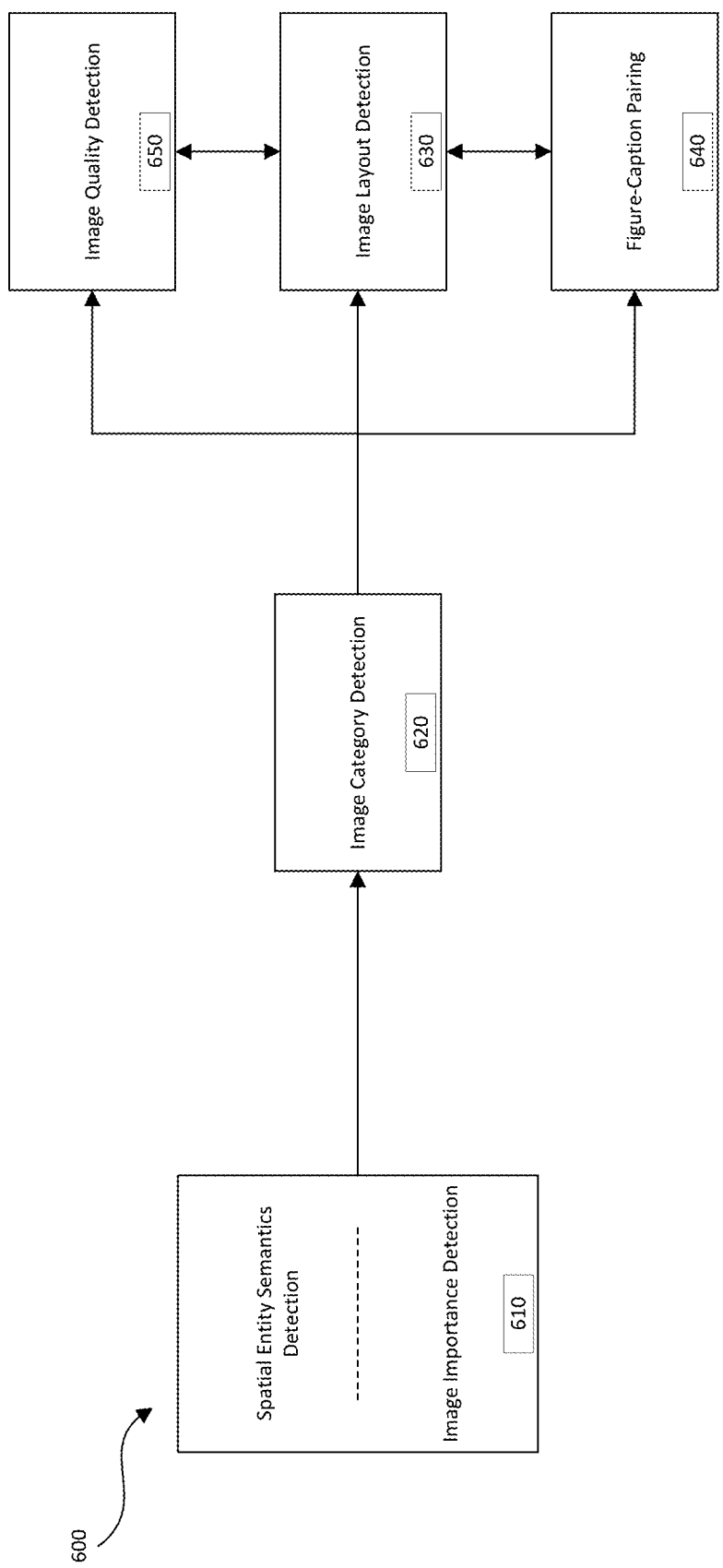
FIG. 6 illustrates another example system for implementing one or more aspects in accordance with various embodiments.

FIG. 6 illustrates another example system for implementing one or more aspects in accordance with various embodiments. In this example embodiment, a system 600 may apply the same or similar processes shown in FIG. 5, but spatial entity semantics detection may occur as a parallel process to determining an importance of an image 610. In this way, both processes may help each other to determine the best anchor image and develop a better understanding of relationships within digital content. For example, spatial entity semantics detection may be applied only to images that are determined to be important, to reduce processing time and power that may be required to analyze a set of images in digital content. The output of this process 610 may be utilized in image category detection 620, which may be a similar process to image category detection process 530 described with respect to FIG. 5. Utilizing this information, the system 600 may perform image layout detection process 630, figure-caption pairing process 640, and image quality detection process 650. These processes may be similar to figure-caption pairing process 540, image layout detection process 550, and image quality detection process 560 described with respect to FIG. 5. It should be understood that for any process herein there can be additional, fewer, or alternative steps performed in similar or alternative orders, or in parallel, within the scope of the various embodiments unless otherwise specifically stated.

Figure 7:
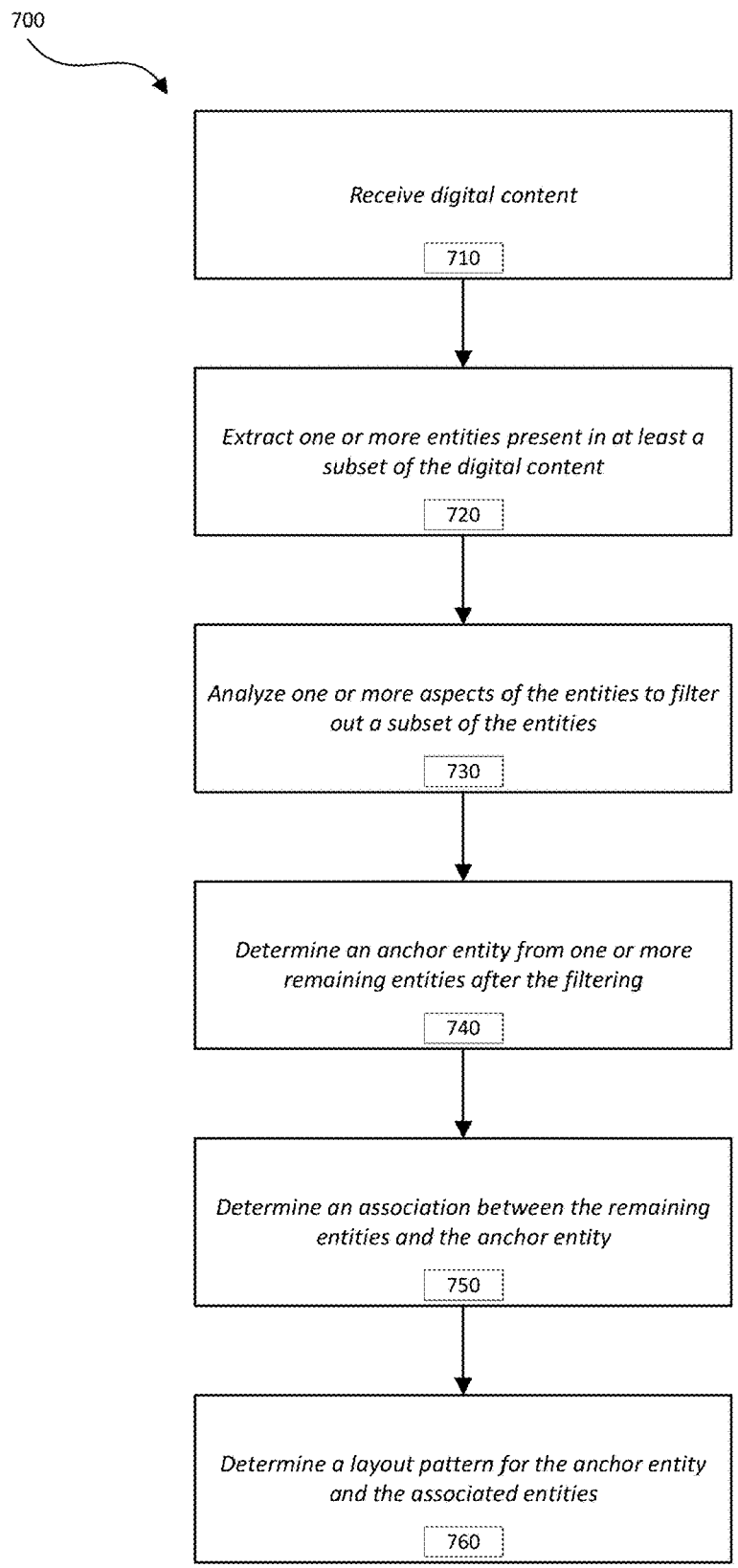
FIG. 7 illustrates an example method that can be utilized to implement one or more aspects in accordance with various embodiments.

FIG. 7 illustrates an example method 700 that can be utilized to implement one or more aspects in accordance with various embodiments. Digital content may be received 710 by a system for processing. The system may detect and extract one or more entities present in at least a subset of the digital content 720. For example, entities may include images, figures, text, captions, spaces, decorative items, and promotional items, among other such items. In an optional embodiment, the system may analyze one or more aspects of the entities to filter out a subset of entities 730. This subset may include entities that are determined to not be relevant or important to the understanding of the digital content. These aspects are described in detail elsewhere herein, and may include image content, text content, context information between text and images or across text and images, image frequency, embedded links between or within entities, keyword references, text presence and positioning, and image density. In an example embodiment, unrelated entities may include decorative items, promotional items, spaces, and other such items which may not be pertinent to the understanding of the subset of the digital content. The system may determine an importance or relevance of the entities with respect to the subset of the digital content, such as by determining a score of individual entities and comparing the scores to a threshold value to assess importance or relevance. After the filtering, or after the one or more entities have been extracted, an anchor entity may be determined 740. The anchor entity may be determined based on one or more entities that are remaining after the filtering has been performed, or it may be determined based on the extracted anchor entities. An anchor entity may be determined based on what the rarer entity is. For example, if there is a single image and text information in the form of captions and paragraphs, the single image may be determined to be the rarer entity. In digital content, there is a possibility of a many-to-many relationship between images and captions. For example, two or more images may share a single caption, or a single image can have multiple text captions. Therefore, by selecting the rarer entity for the anchor entity, the complexity of relationships between images and text can be reduced. More than one anchor entity may be identified in some embodiments.

The system may determine one or more associations between the various entities or remaining entities and the anchor entity 750. Based on the associations, a presentation pattern, for use in presentation of the digital content, may be determined for the anchor entity and the associated entities 760. The presentation pattern may be stored and used as training data for future pattern detection in digital content. The various steps described herein may be performed using machine learning processes, such as through a neural network or classification system for complex relationships. It should be understood that for any process herein there can be additional, fewer, or alternative steps performed in similar or alternative orders, or in parallel, within the scope of the various embodiments unless otherwise specifically stated.

Figure 8:
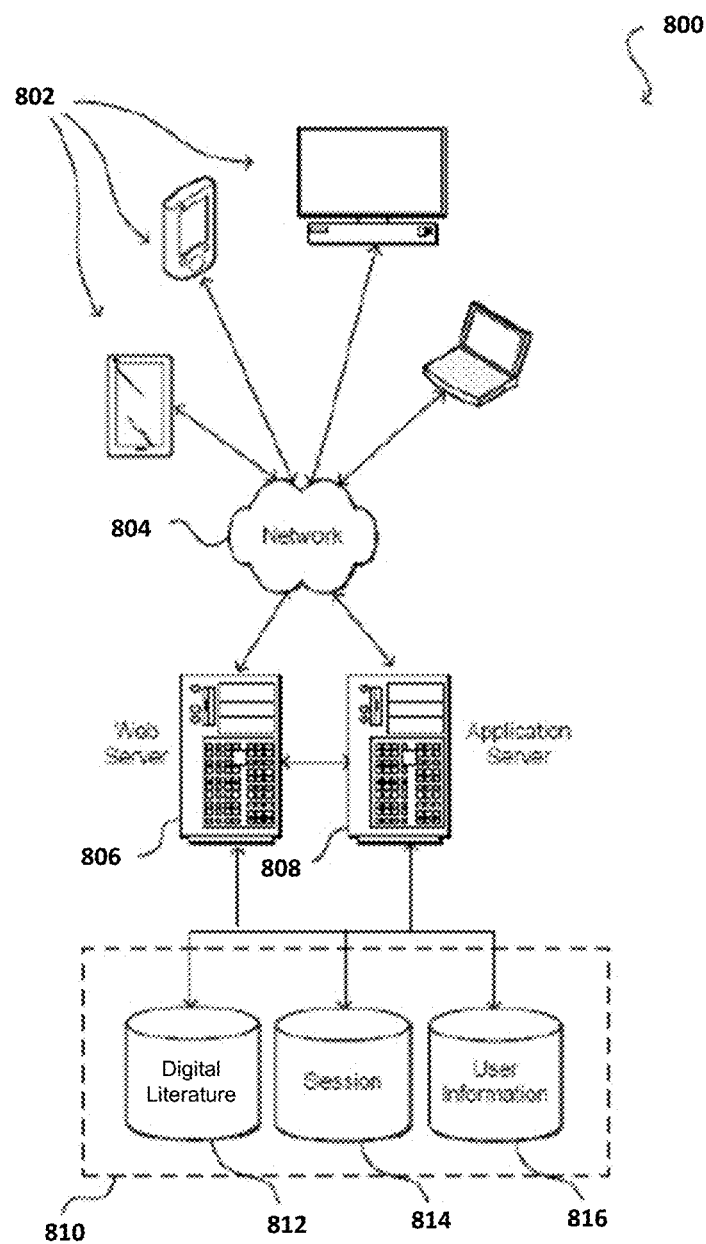
FIG. 8 illustrates an example environment for implementing aspects in accordance with various embodiments.

FIG. 8 illustrates an example environment 800 for implementing aspects in accordance with various embodiments. As will be appreciated, although a Web-based environment is used for purposes of explanation, different environments may be used, as appropriate, to implement various embodiments. The system includes an electronic client device 802, which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term data "store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device 802 and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing digital content 812, pre- or post-modification, and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 802. Information for a particular item of interest can be viewed in a dedicated page or window of the browser. Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure. The various embodiments can be further implemented in a wide variety of operating environments, which in some cases can include one or more user computers or computing devices which can be used to operate any of a number of applications. User or client devices can include any of a number of general-purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Figure 9:
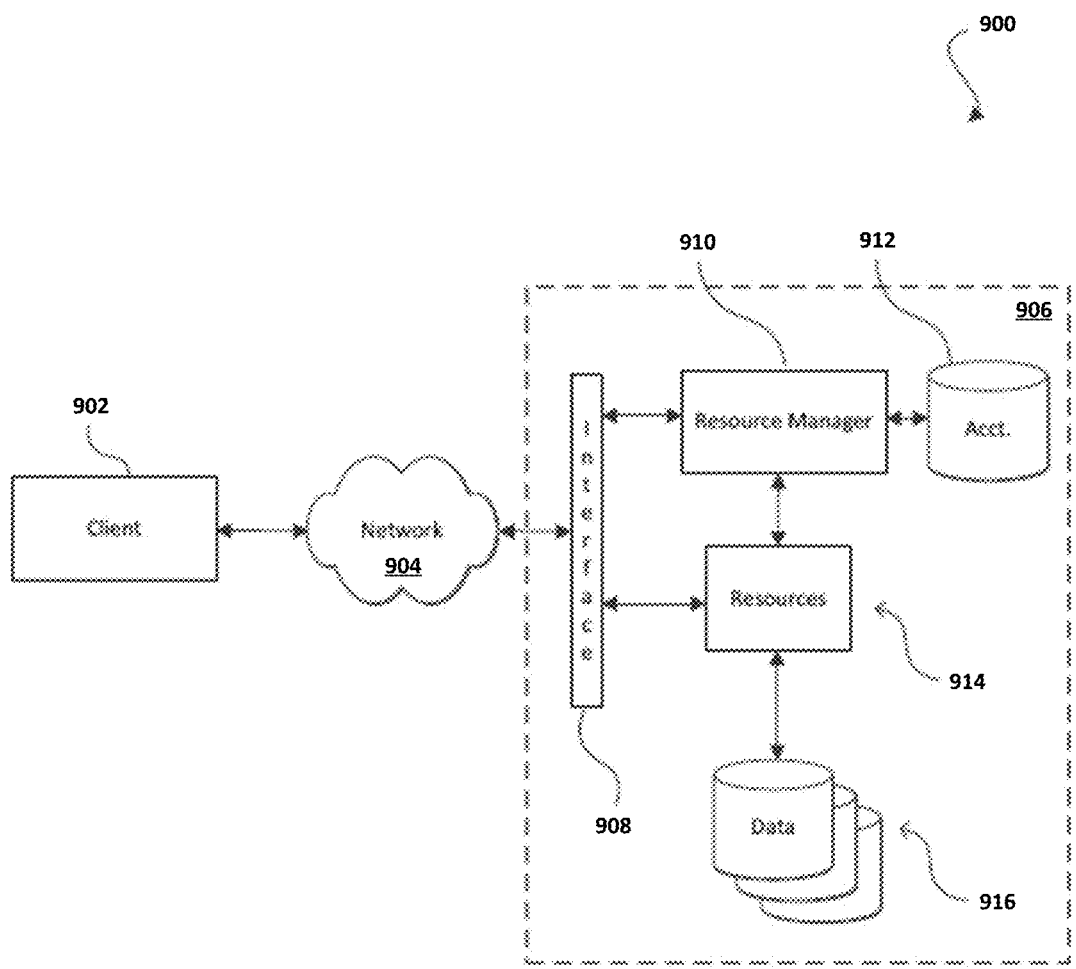
FIG. 9 illustrates an example environment in which aspects of the various embodiments can be implemented.

FIG. 9 illustrates an example environment 900 in which aspects of the various embodiments can be implemented. In this example a user is able to utilize a client device 902 to submit requests across at least one network 904 to a resource provider environment 906. The client device can include any appropriate electronic device operable to send and receive requests, messages, or other such information over an appropriate network and convey information back to a user of the device. Examples of such client devices include personal computers, tablet computers, smart phones, notebook computers, and the like. The network 904 can include any appropriate network, including an intranet, the Internet, a cellular network, a local area network (LAN), or any other such network or combination, and communication over the network can be enabled via wired and/or wireless connections. The resource provider environment 906 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of electronic resources that can be utilized by multiple users for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of electronic resources 914 of one or more types. These types can include, for example, application servers operable to process instructions provided by a user or database servers operable to process data stored in one or more data stores 916 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 914 can submit a request that is received to an interface layer 908 of the provider environment 906. The interface layer can include application programming interfaces (APIs) or other exposed interfaces enabling a user to submit requests to the provider environment. The interface layer 708 in this example can also include other components as well, such as at least one Web server, routing components, load balancers, and the like.

When a request to provision a resource is received to the interface layer 908, information for the request can be directed to a resource manager 910 or other such system, service, or component configured to manage user accounts 912 and information, resource provisioning and usage, and other such aspects. A resource manager 910 receiving the request can perform tasks such as to authenticate an identity of the user submitting the request, as well as to determine whether that user has an existing account with the resource provider, where the account data may be stored in at least one data store 916 in the provider environment. A user can provide any of various types of credentials in order to authenticate an identity of the user to the provider. These credentials can include, for example, a username and password pair, biometric data, a digital signature, or other such information.

The resource provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 902 to communicate with an allocated resource without having to communicate with the resource manager 910, at least until such time as a relevant aspect of the user account changes, the user is no longer granted access to the resource, or another such aspect changes.

The resource manager 910 (or another such system or service) in this example can also function as a virtual layer of hardware and software components that handles control functions in addition to management actions, as may include provisioning, scaling, replication, etc. The resource manager can utilize dedicated APIs in the interface layer 908, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 908 in at least one embodiment includes a scalable set of customer-facing servers that can provide the various APIs and return the appropriate responses based on the API specifications. The interface layer also can include at least one API service layer that in one embodiment consists of stateless, replicated servers which process the externally facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof. In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random-access memory (RAM) or read-only memory (ROM), as well as removable media devices, memory cards, flash cards, etc. Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information.

The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed. Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving digital content;
extracting one or more entities present in at least a subset of the digital content, the one or more entities including at least one image and at least one body of text;
analyzing one or more aspects of the entities to filter out a subset of the entities based, at least in part, upon a determined importance of the entities to the subset of the digital content;
determining an anchor entity from one or more remaining entities after the filtering;
determining, using a machine learning model in which the anchor entity is used as ground truth data, at least one relationship between the one or more remaining entities and the anchor entity;
determining a presentation pattern for the anchor entity and the associated entities based, at least in part, upon the at least one relationship; and
providing the digital content for display based, at least in part, upon the presentation pattern.

2. The computer-implemented method of claim 1, wherein analyzing the one or more aspects of the entities to filter out the unrelated entities further comprises:
determining an importance score of the one or more extracted entities; and removing at least a subset of the one or more entities, wherein the subset includes entities having an importance score falling below a determined threshold.

3. The computer-implemented method of claim 1, wherein the anchor entity is determined based, at least in part, upon an analysis of an amount of the one or more entities corresponding to images and an amount of the one or more entities corresponding to text.

4. The computer-implemented method of claim 1, further comprising:
storing the presentation pattern to a repository, wherein the stored presentation pattern is utilized as training data for relationship detection between entities in other subsets of the digital content.

5. The computer-implemented method of claim 1, wherein the at least one relationship is determined based, at least in part, upon one or more image features and keyword information detected in the extracted entities.

6. A computer-implemented method, comprising:
receiving digital content;
extracting one or more content entities present in at least a subset of the digital content;
determining, based on an importance of the one or more content entities, an anchor entity from the one or more content entities;
determining, using a machine learning model in which the anchor entity is used as ground truth data, an association between the one or more content entities and the anchor entity;
determining a presentation pattern based, at least in part, upon the anchor entity and the association; and
providing the digital content for presentation based, at least in part, upon the presentation pattern.

7. The computer-implemented method of claim 6, further comprising:
analyzing one or more aspects of the entities to filter out a subset of the entities based, at least in part, upon a determined relevance of the entities to the subset of the digital content;
determining an importance score of the one or more extracted entities based, at least in part, upon the one or more aspects; and
removing at least a subset of the one or more entities prior to determining the anchor entity, wherein the subset includes entities having an importance score falling below a determined threshold.

8. The computer-implemented method of claim 6, wherein the anchor entity is determined based, at least in part, upon an analysis of an amount of the one or more entities corresponding to images and an amount of the one or more entities corresponding to text.

9. The computer-implemented method of claim 6, further comprising:
storing the presentation pattern to memory, wherein the stored presentation pattern is utilized as training data for association detection between entities in other subsets of the digital content, and wherein the presentation pattern includes information about a layout of the one or more entities and sequencing information for the one or more entities.

10. The computer-implemented method of claim 6, wherein the association between the one or more remaining entities and the anchor entity is determined based, at least in part, upon one or more image features and keyword information detected in the extracted entities.

11. The computer-implemented method of claim 6, further comprising:
determining a category of the at least one image based, at least in part, upon a determination of whether the image is natural or artificially generated;
determining a type of content in the at least one image; and
determining the association between the one or more remaining entities and the anchor entity based, at least in part, upon the determined category and the type of content.

12. The computer-implemented method of claim 11, further comprising:
assigning a score to the at least one image based upon whether the image is natural or artificially generated;
determining one or more related images having a score that falls within a determined threshold of the assigned score; and
associating the at least one image and the one or more related images for use in determining the presentation pattern.

13. The computer-implemented method of claim 6, further comprising:
determining an image quality of the at least one image;
determining that the image quality falls below a threshold level of quality; and
providing information about the image quality to a publisher or author of the digital content.

14. A system, comprising:
at least one processor; and
a memory device including instructions that, when executed by the at least one processor, cause the system to:
receive digital content;
extract one or more content entities present in at least a subset of the digital content;
determine, based on an importance of the one or more content entities, an anchor entity from the one or more content entities;
determine, using a machine learning model in which the anchor entity is used as ground truth data, an association between the one or more content entities and the anchor entity;
determine a presentation pattern based, at least in part, upon the anchor entity and the association; and
provide the digital content for presentation based, at least in part, upon the presentation pattern.

15. The system of claim 14, wherein the instructions, when executed by the at least one processor, further cause the system to:
analyze one or more aspects of the entities to filter out a subset of the entities based, at least in part, upon a determined relevance of the entities to the subset of the digital content;
determine an importance score of the one or more extracted entities based, at least in part, upon the one or more aspects; and
remove at least a subset of the one or more entities prior to determining the anchor entity, wherein the subset includes entities having an importance score falling below a determined threshold.

16. The system of claim 14, wherein the anchor entity is determined based, at least in part, upon an analysis of an amount of the one or more entities corresponding to images and an amount of the one or more entities corresponding to text.

17. The system of claim 14, wherein the association between the one or more remaining entities and the anchor entity is determined based, at least in part, upon one or more image features and keyword information detected in the extracted entities.

18. The system of claim 14, wherein the instructions, when executed by the at least one processor, further cause the system to:

determine a category of the at least one image based, at least in part, upon a determination of whether the image is natural or artificially generated;

determine a type of content in the at least one image; and determine the association between the one or more remaining entities and the anchor entity based, at least in part, upon the determined category and the type of content.

19. The system of claim 18, wherein the instructions, when executed by the at least one processor, further cause the system to:

assign a score to the at least one image based upon whether the image is natural or artificially generated;

determine one or more related images having a score that falls within a determined threshold of the assigned score; and associate the at least one image and the one or more related images for use in determining the presentation pattern.

20. The system of claim 14, wherein the instructions, when executed by the at least one processor, further cause the system to:

store the presentation pattern to memory, wherein the stored presentation pattern is utilized as training data for association detection between entities in other subsets of the digital content.

\* \* \* \* \*